(12) United States Patent
Lam et al.

(10) Patent No.: US 6,956,653 B1
(45) Date of Patent: Oct. 18, 2005

(54) DUAL ELECTROOPTIC WAVEGUIDE INTERFEROMETER

(75) Inventors: Lawrence Kwong Lam, San Jose, CA (US); Timothy Edwin Van Eck, Los Altos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 821 days.

(21) Appl. No.: 09/604,662

(22) Filed: Jun. 27, 2000

(51) Int. Cl.[7] ............................................... G01B 9/02
(52) U.S. Cl. ....................................................... 356/477
(58) Field of Search ................................ 356/477, 478, 356/482; 250/227.19, 227.27; 385/12; 324/95, 324/96, 97, 76.39

(56) References Cited

U.S. PATENT DOCUMENTS

| | | | | |
|---|---|---|---|---|
| 4,169,980 A | * | 10/1979 | Zanoni | 356/512 |
| 4,668,093 A | * | 5/1987 | Cahill | 356/477 |
| 4,747,688 A | * | 5/1988 | Geary | 356/477 |
| 5,172,185 A | * | 12/1992 | Leuchs et al | 356/482 |
| 5,710,629 A | * | 1/1998 | Kevorkian et al | 356/477 |
| 6,081,335 A | | 6/2000 | Seki | |

* cited by examiner

Primary Examiner—Samuel A. Turner
(74) Attorney, Agent, or Firm—McDermott Will & Emery LLP

(57) ABSTRACT

A dual electrooptic interferometer and method for operation thereof. In a preferred embodiment, the interferometer includes first and second electro-optically active optical waveguides; a first electrode substantially parallel to the first waveguide in a traveling wave modulator configuration; a second electrode substantially parallel to the second waveguide in a traveling wave modulator configuration; and a photo detector array optically coupled to the outputs of the waveguides.

23 Claims, 14 Drawing Sheets

DUAL ELECTROOPTIC WAVEGUIDE INTERFEROMETER

BACKGROUND OF THE INVENTION

1. Field of the Invention

The present invention relates generally to electrooptic modulators, and more particularly to an interferometer based on an electrooptic modulator.

2. Related Art

Interferometers have been historically useful instruments for the characterization of light or the material that light passes through. Some are used for estimating the refractive indices of optical material, such as the Rayleigh, Kosters, Dowell, Jami, or the Sirks-Pringsheim interferometers. Others are used for measuring the angular dimensions of astronomical objects such as the Michelson stellar interferometer, or for making microscopic measurements as is the case with the Dyson interferometer microscope. Then there are the Zernike phase contrast microscope, the Gabor hologram and the Fabry-Perot etalon. All of these instruments exploits the same phenomenon of using perfectly or partially coherent light to produce an interference pattern, a phenomenon that was first demonstrated in Young's experiment.

SUMMARY OF THE INVENTION

The present invention is a dual electrooptic interferometer and method for operation thereof. In a preferred embodiment, the interferometer includes first and second electrooptically active optical waveguides; a first electrode substantially parallel to the first waveguide in a traveling wave modulator configuration; a second electrode substantially parallel to the second waveguide in a traveling wave modulator configuration; and a photo detector array optically coupled to the outputs of the waveguides.

In one aspect of the invention, the photo detector array includes a photo detector array.

In another aspect of the invention, the invention includes a decoder coupled to the photo detector.

In another aspect of the invention, the invention includes an optical divider coupled between the inputs of the first and second optical waveguides.

In another aspect of the invention, the invention includes an optical source coupled to the input of the optical divider.

In another aspect of the invention, the invention includes a lens assembly optically coupled between the outputs of the first and second optical waveguides and the photo detector array.

In another aspect of the invention, the outputs of the waveguides are angled towards each other to produce a focal point.

In another aspect of the invention, the lens assembly includes a magnifying lens optically coupled to the waveguide output ports; a one-dimensional focusing lens coupled to the magnifying lens; and a micro-lens coupled between the focusing lens and the photo detector array.

In another aspect of the invention, the lens assembly includes a prism.

In another aspect of the invention, the lens assembly includes an optical Rotman lens.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings.

DETAILED DESCRIPTION OF THE PREFERRED EMBODIMENTS

The present invention is described in terms of examples. This is for convenience and clarity only and is not intended to limit the application of the present invention. In fact, after reading the following description, it will be apparent to one skilled in the relevant art how to implement the present invention in alternative embodiments.

The present invention is a new interferometer referred to herein as a Dual Electrooptic Waveguide Interferometer (DEWI). It comprises two optical waveguides that are electrooptically modulated by separate electrodes. The outputs of the waveguides are combined by diffraction, and in the process create an interference pattern. This pattern is created in the Fraunhofer region in the basic design, but it is located within the Fresnel zone in a more advanced design. The interference pattern is captured by an optical system and projected onto an array of photo detectors.

The locations of the nulls in the interference pattern as detected by photo detectors are used to estimate the optical phase difference between the outputs of the waveguides. The phase difference is a function of the amplitude of the electrical signals applied to a pair of electrodes, which control the refraction indices in the waveguides.

A basic version of the DEWI interferometer uses an integrated optical splitter at the front end. A simpler variant of it does not contain an optical splitter. Instead it accepts the optical signals as separate inputs, and measures the phase difference between them, under the control of the voltages applied to the electrooptic electrodes. This variant could be used to estimate a variable, beside the electrooptic voltages, that affected the relative phase of the optical inputs.

The potential applications of a DEWI type interferometer are wide ranging. They include
1. Multi-giga-samples-per-second analog to digital converters,
2. Phase difference measurements of received optical pulses, and
3. Precision optical direction finding subsystem for seeker application.

Variants of the DEWI interferometer may be applicable to Doppler Lidar signal processing and optical wavefront sensing.

Figure 1:
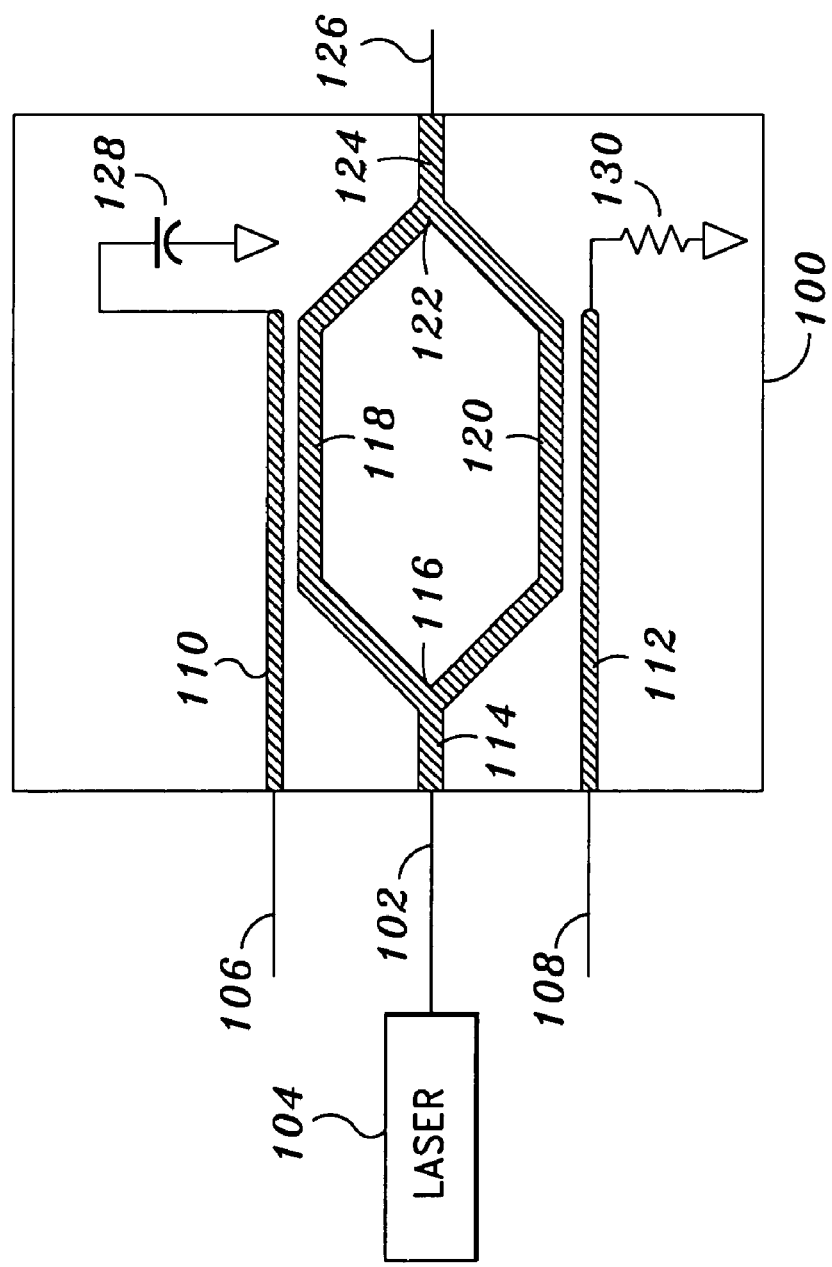
FIG. 1 depicts a waveguide version of a Mach-Zender type modulator.

FIG. 1 depicts a conventional waveguide version of a Mach-Zender type interferometer 100. Interferometer 100 receives an optical signal 102 from an optical source, such as laser 104. Interferometer 100 also receives two electrical signals 106 108. Signal 106 is a reference voltage. Signal 108 is a data signal to be processed.

Interferometer 100 includes two electrodes 110 and 112. In a preferred embodiment, electrodes 110 and 112 are microstrip line electrodes. Electrodes 110 and 112 receive electrical signals 106 and 108, respectively. Electrodes 110 and 112 are terminated to ground by capacitor 128 and resistor 130, respectively.

Interferometer 100 also includes a plurality of waveguide components. Input section 114 receives optical signal 102 and feeds it to an optical divider 116, which splits the signal between two modulation sections 118 and 120. Electrode 110 is substantially parallel to waveguide modulation section 118 in a traveling wave modulator configuration that is well-known in the relevant arts. Similarly, electrode 112 is substantially parallel to waveguide modulator section 120 in a traveling wave modulator configuration. Modulation sections 118 and 120 are coupled to output section 124 by a combiner 122. The modulated optical signal leaves interferometer 100 as optical signal 126.

The intensity I of the optical output signal is given by $$I = \frac{I_o}{2}(1 + \cos\Delta\phi)$$

where $\Delta\phi$ is the phase difference between the optical signals on the waveguides. The optical lengths of the waveguides are controlled based on the electrooptic effect, which contains a linear component, the Pockels effect, and a nonlinear component, the Kerr effect. The refraction indices in the waveguides are controlled by the electrical signals applied to the electrodes placed near the waveguides.

Interferometer 100 can be used to measure an unknown input voltage differentially applied across electrodes 106 and 108. The intensity of the output optical signal 126 will vary as a function of the voltages applied to electrodes 106 and 108. Therefore, by detecting the intensity of output optical signal 126, the voltage differential across electrodes 106 and 108 can be determined.

A Mach-Zehnder modulator is characterized by a sensitivity parameter called the half-wave voltage, $V\pi$. The intensity of the optical output signal changes from a maximum to a minimum, or vice versa, when the amplitude of the applied voltage is changed by an amount equal to $V\pi$. This threshold voltage specifies what is required to produce a change of 180 degrees relative phase between the optical signals.

The conventional Mach-Zender type interferometer 100 shown in FIG. 1 has a couple of draw backs in voltage measurement applications. First, the intensity of the output optical signal 126 depends on the intensity of the input optical signal 102, which is subject to slow drifts and high frequency fluctuations. Without putting the laser 104 under a the control of a precision feedback circuit to stabilize the output of laser 104, the drifts and fluctuation of the output intensity will induce noise into voltage measurements made using the conventional Mach-Zender type interferometer 100.

The second disadvantage is that the intensity of the output optical signal 102 is a highly non-linear function of the voltages applied differentially across the electrodes 106 and 108. In addition, the intensity of the output optical signal 102 is the same for a positive as well as a negative differential voltage of the same level. Hence, to obtain a quasi-linear relationship between the intensity of the output optical signal 126 and the differential voltage applied to electrodes 106 and 108, the differential voltage must be restricted to a positive voltage or a negative voltage and within a relatively narrow range compared to $V\pi$.

Figure 2:
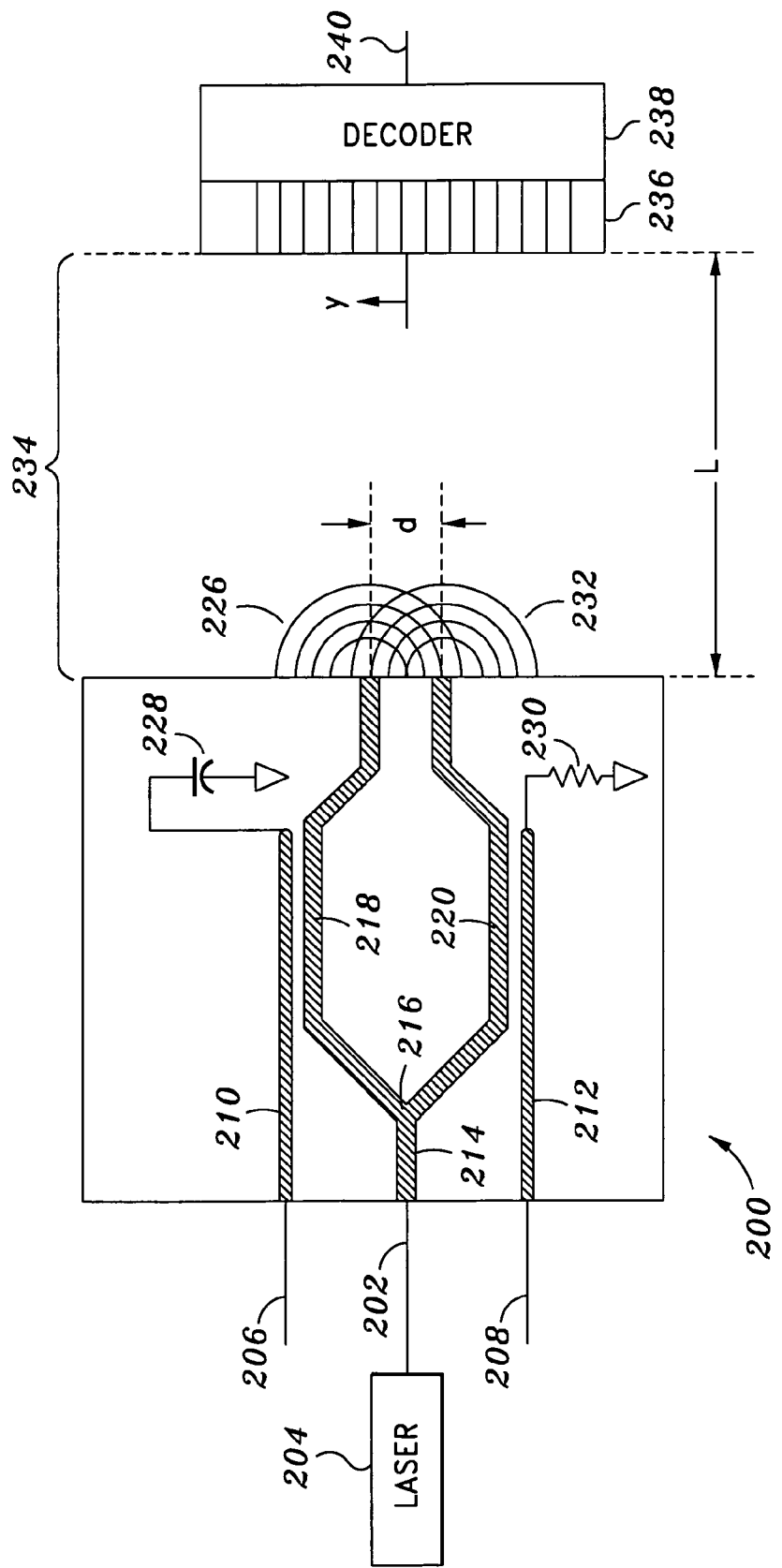
FIG. 2 depicts a dual electrooptic waveguide interferometer (DEWI) according to a preferred embodiment of the present invention.

FIG. 2 depicts a dual electrooptic waveguide interferometer (DEWI) 200 according to a preferred embodiment of the present invention. Interferometer 200 operates by detecting the location of the null of the interference pattern on the photo detector array 236. Interferometer 200 receives an optical signal 202 from an optical source, such as laser 204. Interferometer 200 also receives two electrical signals 206 and 208. Signal 206 is a reference voltage. Signal 208 is a data input signal to be processed.

Interferometer 200 includes a reference electrode 210 and a RF input electrode 212. In a preferred embodiment, electrodes 210 and 212 are microstrip transmission line electrodes. Electrodes 210 and 212 receive electrical signals 206 and 208, respectively. Electrodes 210 and 212 are terminated to ground by capacitor 228 and resistor 230, respectively. In a preferred embodiment, RF input electrode 212 is a 50-ohm transmission line and resistor 230 is a 50-ohm resistor.

Interferometer 200 also includes a plurality of waveguide components. Input section 214 receives optical signal 202 and feeds it to an optical divider 216, which splits the signal between two modulation sections 218 and 220. Reference electrode 210 is substantially parallel to waveguide modulation section 218 in a traveling wave modulator configuration that is well-known in the relevant arts. Similarly, RF input electrode 212 is substantially parallel to waveguide modulator section 220 in a traveling wave modulator configuration. The modulated optical signals leave the exit apertures of waveguides 218 and 220 as optical signals 226 and 232, respectively.

On exiting, optical signals 226 and 232 enter a diffraction section 234 where they interfere to create an interference pattern upon a photo detector array 236. Photo detector array 236 is comprised of a series of photo detector elements. The interference pattern that falls on photo detector array 236 is a function of $\lambda_o$ (the free-space optical wavelength), d (the separation between the waveguide exit apertures), L (the distance from the exit apertures to the photo detector array), and the voltages applied to electrodes 210 and 212. Applying voltages to electrodes 210 and 212 affects the optical phases of the optical signals in the associated waveguides, and hence the output interference pattern. In a preferred embodiment, a decoder 238 is employed to convert the interference pattern to a digital signal 240.

In operation, interferometer 200 is used to measure an unknown input voltage $V_{in}$. When an input voltage $V_{in}$ is applied to RF input electrode 212, an interference pattern will be produced on photo detector array 236. The location of the nulls of the interference pattern will be a function of $V_{in}$. Therefore, by detecting the location of the nulls, the unknown input voltage $V_{in}$ can be determined. Interferometer 200 detects the location of the null, and not the maximum, of the interference pattern because the width of a null is narrower than the width of a maximum, and thus the location of a null can be detected more precisely. The circuits that process the outputs of the photo detector array 236 are designed to detect the null location y, where y=0 is defined to be the center of the photo detector array 236. The input voltage $V_{in}$ can vary from a negative value to a positive value. Correspondingly, the null location varies from a negative value to a positive value.

The positions of the individual photo detector elements making up photo detector array 236 are chosen such that the nulls will fall within the photo detector array 236 for the full desired input voltage swing of $V_{in}$. The following equation can be used to calculate a rough location of the null y for a given input voltage $V_{in}$:

$$V_{in} = \left\{ \frac{2d}{\lambda_o} \frac{y}{\sqrt{L^2 + y^2}} \pm 2m \right\} V_\pi, m = 0, 1, 2, \cdots$$

The above equation is based on the assumption of an "ideal" interferometer; that is, that electrodes 210 and 212 are identical and waveguides 218 and 220 have the same optical lengths. For an ideal interferometer, applying the same voltages to electrodes 210 and 212 would induce the same optical phase changes on the optical signals in corresponding waveguides 218 and 220. Hence, the optical phase difference at the exits of waveguides 210 and 212 would be zero. In this case, the maximum amplitude of the interference pattern would be located at the center of the photo detector array 236.

The half-wave voltage, $V_\pi$, is the voltage required to induce an optical phase change of 180 degrees ($\pi$ radians) on the optical signal propagating in the waveguide. The value of $V_\pi$ is design dependent. The value of $V_\pi$ for an ideal interferometer can be calculated based on the dimensions of the electrode and waveguide, and the material properties of the electro-optical active material in the waveguide. (Ref. John M. Senior, Optical Fiber Communications: Principles and Practice, Second Editor, Chap 10, Section 10.6.2, Prentice Hall, New York, 1995).

The index m in the above equation indicates several possible solutions. In order words, the null location, y, does not uniquely define the input voltage because the voltage on the electrode induces an optical phase shift on the optical signal, and optical phase shifts are periodic with a period of 360 degrees or $2\pi$ radians. Consider an example where $V_\pi$=10 volts. If an input voltage of 1 V produces a null located at position y, then input voltages of +21 volts, and −19 volts would also produce a null at the same position. Note that voltages are 20 volts from 1 volt, or 360 degrees, or $2\pi$ radians, relative to the phase shift induced by 1 volt. In practice, a circuit that constrains the input signal to be within a known range can be used. Therefore, this ambiguity can be eliminated.

In actual operation of a real interferometer 200, the location of the nulls y may not fall exactly according to the above equation. This is because in actual devices, the waveguides may not be identical as a result of several potential factors. They include differences by design, or differences due to fabrication imperfection. Therefore, a calibration procedure is performed. The objective of the calibration is to produce a transfer function for the interferometer 200 and to verify that the transfer function meets design specifications. The transfer function is defined by a table that relates the voltage on the RF input electrode 212 to the null location of the interference pattern as detected by the photo detector array 236.

The calibration steps are:

1. Apply zero voltage to the RF input electrode 212; in other words, ground RF input electrode 212.
2. Apply a positive voltage to the reference electrode 210 to produce an interference pattern whose null is located at the center of the photo detector array (y=0). Since any voltage applied to reference electrode 210 would affect the location null, a variable voltage should be applied to observe the movement of the null. The voltage level required to put the null at the center is recorded. It should be approximately equal to the value of $V_\pi$ volts calculated for the ideal interferometer (i.e. an interferometer with identical optical waveguides).
3. The voltage recorded in step 2 is denoted the reference voltage, $V_{ref}$, which should be maintained on electrode 210 for the rest of the calibration procedure.
4. With $V_{ref}$ on electrode 210, apply different voltages to input electrode 212 varying from negative $V_\pi$ to positive $V_\pi$. For example, if $V_\pi$=10 V, then the input voltage should be varied from negative 10 volts to positive 10 volts.
5. As the input voltage is varied in small increments, the corresponding null locations of the interference pattern are recorded to create the transfer function.

Since the photo detector array 236 comprises a finite number of discrete photo detectors, the null location is detected with a discrete level of accuracy. After the above calibration procedure is performed, the value of an unknown input voltage $V_{in}$ may be inferred based on the null location detected by the photo detector array 236. In a perfectly linear device, the locations of the nulls should be the same for input voltages of 0, $\pm 2V\pi$, $\pm 4V\pi$, . . . and so on. If the non-linear electrooptic effect became a significant factor, then this would not hold.

Interferometer 200 operates by detecting the location of the null, while conventional interferometer 100 shown in FIG. 1 operates by detecting the intensity of the output signal. Interferometer 200 has the following advantages compared to interferometer 100. First, location of the null is not a function of the intensity of the optical input signal 202. Therefore, interferometer 200 minimizes measurement errors due to fluctuations in the input optical signal.

The second advantage is that the interferometer 200 is more linear than interferometer 100. There is a relatively linear relationship between the differential voltage applied across the electrodes 210 and 212 and the location of the null of the interference pattern on the photo detector array 236. There is a slight non-linearity, however it can be compensated by appropriately positioning the detectors in the photo detector array 236. The range of differential voltage measurement can cover a full range of $\pm V_\pi$. In addition, extending the range of differential voltage measurement beyond $\pm V_\pi$ is discussed later with respect to FIG. 8. The embodiment shown in FIG. 8 uses two DEWI in parallel to extend the range of differential voltage measurement by a factor of 8 while maintaining the same measurement precision.

Figure 3:
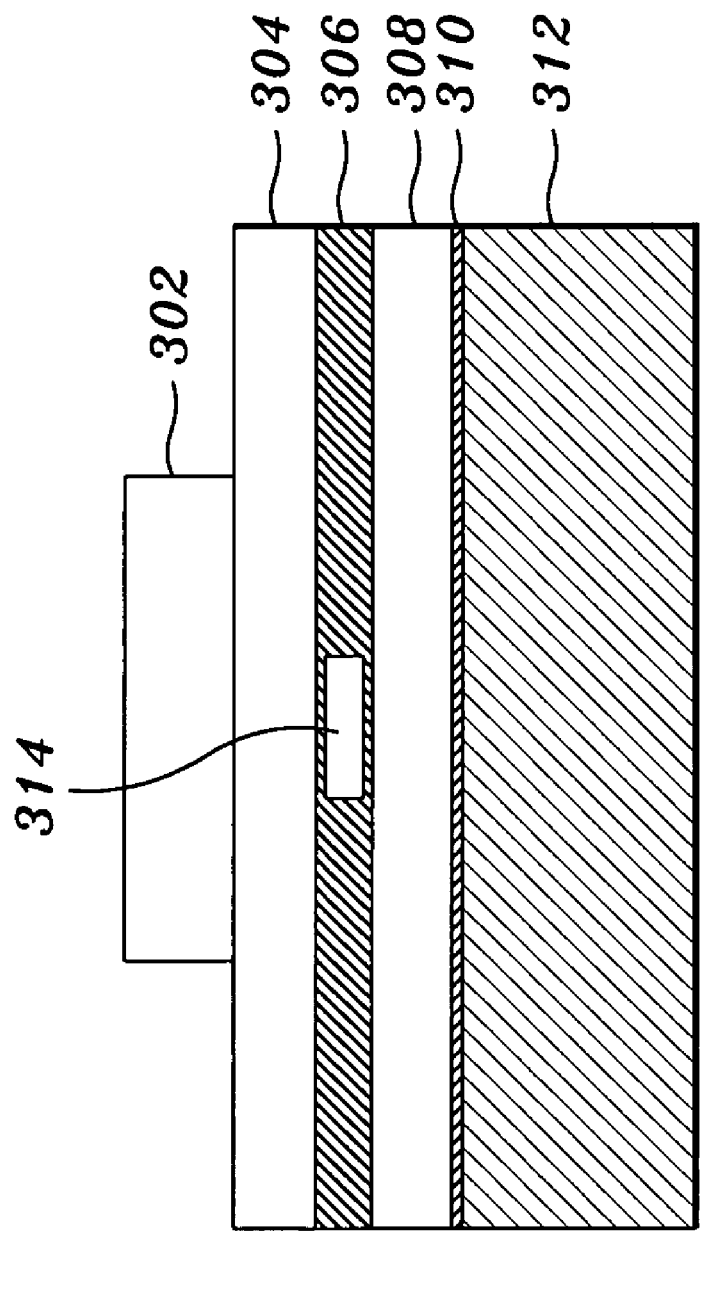
FIG. 3 illustrates a cross-section of a polymer optical channel waveguide.

FIG. 3 illustrates a cross-section of a polymer optical channel waveguide 300. In a preferred embodiment, waveguide 300 is used to implement waveguides 218 and 220 in interferometer 200. Referring to FIG. 3, a 0.5 micrometer aluminum ground plane 310 is deposited upon a silicon substrate 312. Upon ground plane 310 is disposed a sandwich of a 2.0 micrometer electrooptic polymer 306 surrounded by two layers of 3.0 micrometer cladding material 304 and 308. Upon this sandwich is deposited a 4.0 micrometer wide gold microstrip electrode 302. Within polymer 306 is formed an active waveguide channel 314 that is 5 micrometers wide. In a preferred embodiment, the index of refraction for cladding layers 304 and 308 is approximately 1.5, the index of refraction for the inactive portions of polymer 306 is approximately 1.6, and the index of refraction for active polymer 314 is approximately 1.6+0.005. The wavelength of operation is 0.83 micrometers.

Figure 4:
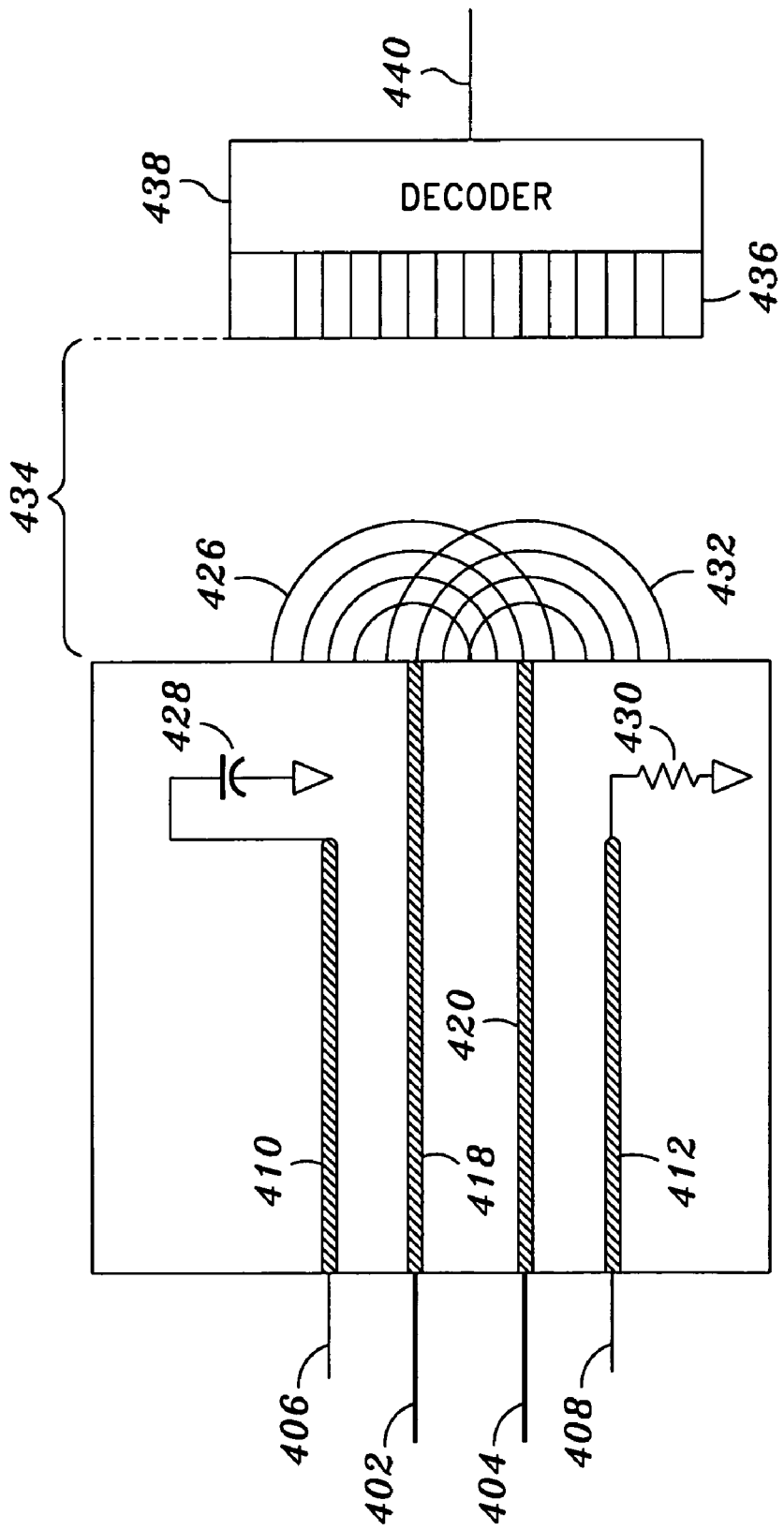
FIG. 4 depicts an embodiment of the DEWI interferometer that accepts light collected by separate optical sensors, or light collected by a sensor but passed through different fibers.

FIG. 4 depicts an embodiment 400 of the DEWI interferometer that accepts light collected by two separate optical sensors, or light collected by a sensor but passed through two different fibers. This embodiment may be used to implement a variety of transducers for detecting the optical phase difference $\Delta\phi$ between two input optical signals. If the first optical signal represents a reference signal and the second a phase modulated optical signal, then this embodiment may be used to demodulate the phase information modulated on the optical signal. If the first and the second optical signals represent the outputs of two telescopes, looking at a very faint astronomical body, this embodiment may be used to detect and characterize this object.

As another example, a delay line based frequency discriminator could be implemented to measure optical frequency. The stress in a fiber may be detected using an optical phase difference measurement transducer. The electrical signals applied to the electrodes could be used to control or calibrate transducers. The outputs from these transducers could be part of a feed back circuit to perform phase locking, frequency locking, or optical beam steering functions.

Referring to FIG. 4, interferometer 400 receives two optical signals 402 and 404. Interferometer 400 also receives two electrical signals 406 and 408. Signal 406 is a reference voltage. Signal 408 can be varied as desired.

Interferometer 400 includes two electrodes 410 and 412. In a preferred embodiment, electrodes 410 and 412 are microstrip transmission line electrodes. Electrodes 410 and 412 receive electrical signals 406 and 408, respectively. Electrodes 410 and 412 are terminated to ground by capacitor 428 and resistor 430, respectively. In a preferred embodiment, electrode 412 is a 50-ohm transmission line and resistor 430 is a 50-ohm resistor.

Interferometer 400 also includes a pair of waveguide modulation sections 418 and 420. Electrode 410 is substantially parallel to waveguide modulation section 418 in a traveling wave modulator configuration that is well-known in the relevant arts. Similarly, electrode 412 is substantially parallel to waveguide modulator section 420 in a traveling wave modulator configuration. The modulated optical signals leave the exit apertures of waveguides 418 and 420 as optical signals 426 and 432, respectively.

On exiting, optical signals 426 and 432 enter a diffraction section 434 where they interfere to create an interference pattern upon a photo detector array 436. In a preferred embodiment, a decoder 438 is employed to convert the interference pattern to a digital signal 440.

In operation, interferometer 400 is used to determine an unknown optical phase difference $\Delta\phi$ between the two optical input signals, based on the null location y of the interference pattern. For an ideal interferometer (i.e. an interferometer with identical optical waveguides), the expression that describes the relationship between input optical phase difference $\Delta\phi$ and the null location y is $$\Delta\phi = \frac{2\pi}{\lambda_o} d \frac{y}{\sqrt{L^2 + y^2}}.$$

Interferometer 400 should be calibrated before it is used to sample and measure the optical phase difference between two optical signals at the inputs to the optical waveguides 418, 420. The objective of calibration is to produce a transfer function that defines the relationship between optical phase difference and null location. The input optical phase difference varies from a negative 180 degrees to a positive 180 degrees. Correspondingly, the null location varies from a negative value to a positive value along the y dimension of the photo detector array, 436, where y=0 is defined to be the center of the photo detector array 436.

The following calibration procedure is devised assuming the objective is to equate a null location at y=0 to a zero degree optical phase difference. The null location is to be detected by the photo detector array 436, where y=0 is defined to be the middle of the array. The phase difference is defined to be the optical phase difference between the optical signals at the inputs to optical waveguides 418, 420.

1. Apply two optical signals to the waveguides 418, 420 with the same optical phase and optical frequency.
2. Connect electrode 412 to ground.
3. Apply a positive voltage to the reference electrode 410, and vary the voltage until the interference null is located in the center of photo detector (y=0). Record the actual voltage level required to attain this result. For an interferometer with identical optical waveguides, the voltage required to attain this should be approximately equal to $V_\pi$. However, a small deviation from $V_\pi$ is expected in practice because of fabrication imperfections.
4. The voltage recorded in step 3 is denoted the reference voltage, $V_{ref}$, which should be maintained on electrode 410 for the rest of this calibration procedure.
5. Maintain a constant voltage level of $V_{ref}$ volts at the electrode 410, and vary the optical phase difference at the inputs to the optical waveguides 418, 420.
6. As the input optical phase difference is varied, the null location of the interference pattern is moved from one photo detector to another in the detector array. Record the input optical phase difference and the corresponding null locations.

Once calibration is completed, the unknown input optical phase difference may be inferred upon based on detecting the null location of the interference pattern.

Figure 5A:
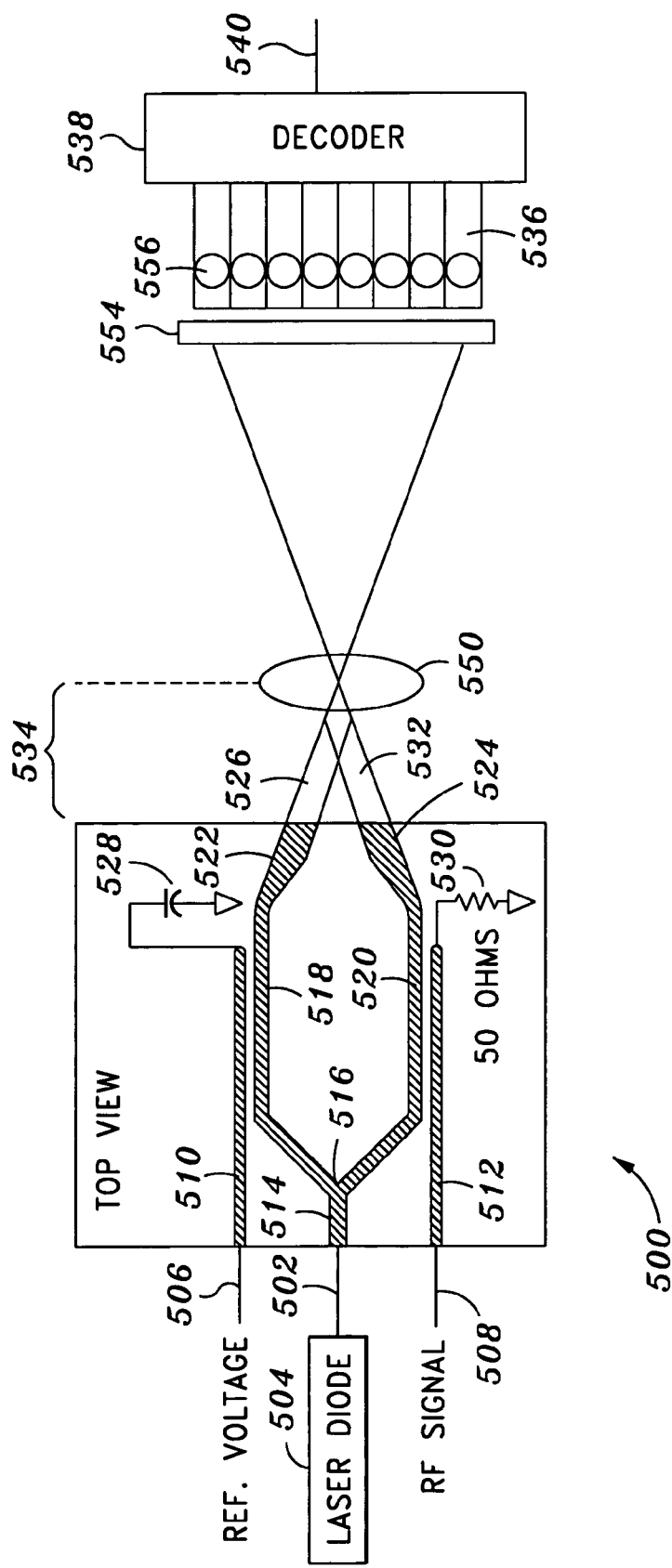
FIGS. 5A and 5B depict a dual electrooptic waveguide interferometer (DEWI) according to a preferred embodiment of the present invention.
Figure 5B:
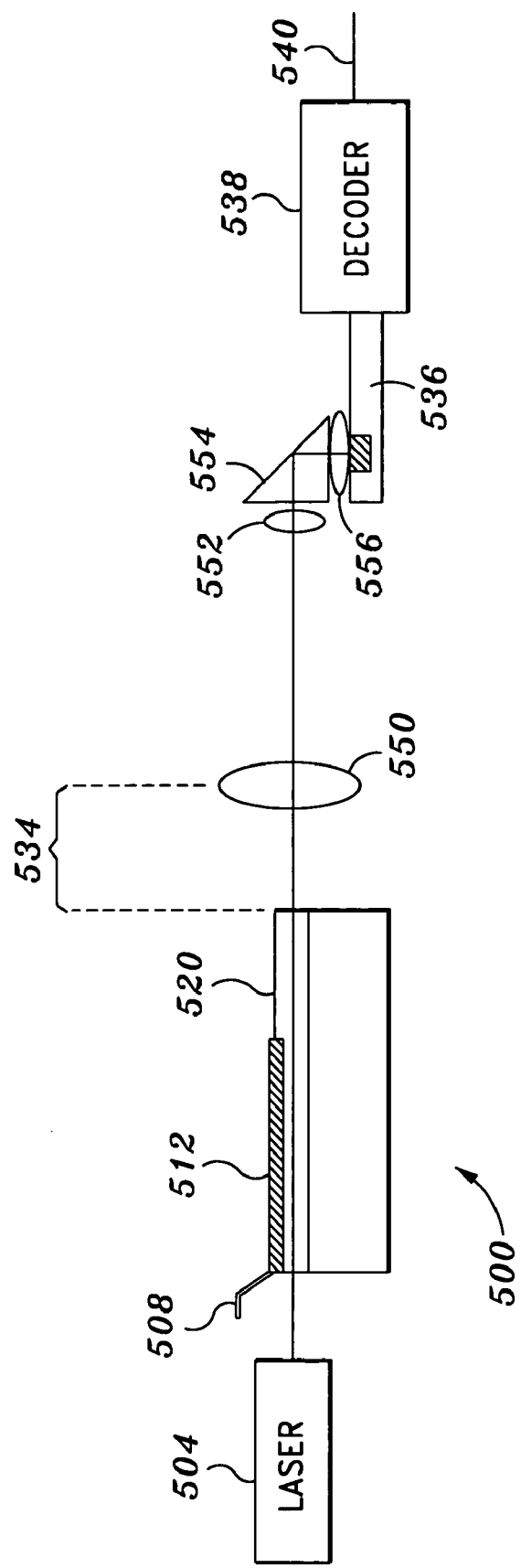

FIGS. 5A and 5B depict a dual electrooptic waveguide interferometer (DEWI) 500 according to a preferred embodiment of the present invention. In this embodiment, the terminal portions of the waveguides are separated by more than 20 $\mu$m and they are at an angle relative to each other. This angle is designed to produce a real image at a plane a predetermined distance from the exit apertures. For a slant angle of $\theta_o$=0.1 radian, the interference pattern is taken from a plane 250 $\mu$m away.

FIG. 5A is a "top" view of interferometer 500. FIG. 5B is a "side" view of interferometer 500. Interferometer 500 receives an optical signal 502 from an optical source, such as laser 504. Interferometer 500 also receives two electrical signals 506 and 508. Signal 506 is a reference voltage. Signal 508 is a data signal to be processed.

Interferometer 500 includes two electrodes 510 and 512. In a preferred embodiment, electrodes 510 and 512 are microstrip transmission line electrodes. Electrodes 510 and 512 receive electrical signals 506 and 508, respectively. Electrodes 510 and 512 are terminated to ground by capacitor 528 and resistor 530, respectively. In a preferred embodiment, electrode 512 is a 50-ohm transmission line and resistor 530 is a 50-ohm resistor.

Interferometer 500 also includes a plurality of waveguide components. Input section 514 receives optical signal 502 and feeds it to an optical divider 516, which splits the signal between two modulation sections 518 and 520. Electrode 510 is substantially parallel to waveguide modulation section 518 in a traveling wave modulator configuration that is well-known in the relevant arts. Similarly, electrode 512 is substantially parallel to waveguide modulator section 520 in a traveling wave modulator configuration. Modulation sections 518 and 520 feed exit sections 522 and 524, which are angled towards each other, as described above. The modulated optical signals leave the exit apertures of exit sections 522 and 524 as optical signals 526 and 532, respectively.

On exiting, optical signals 526 and 532 enter a diffraction section 534 where they produce a real image in front of a lens 550. The output of lens 550 is received first by a one-dimensional focusing lens 552, and then by a prism 554. Prism 554 functions as a mirror to bend the light from a horizontal propagating light to a vertically propagating light, which is passed by an array of micro-lenses 556 to produce an interference pattern upon photo detector array 536. In a preferred embodiment, a decoder 538 is employed to convert the interference pattern to a digital signal 540.

High speed analog to digital converters are used in many radar and communications systems. They provide the digital data for the application of advanced signal processing algorithms. As the speed of digital electronics improves, the demand for high speed analog to digital converters also increases.

Figure 6:
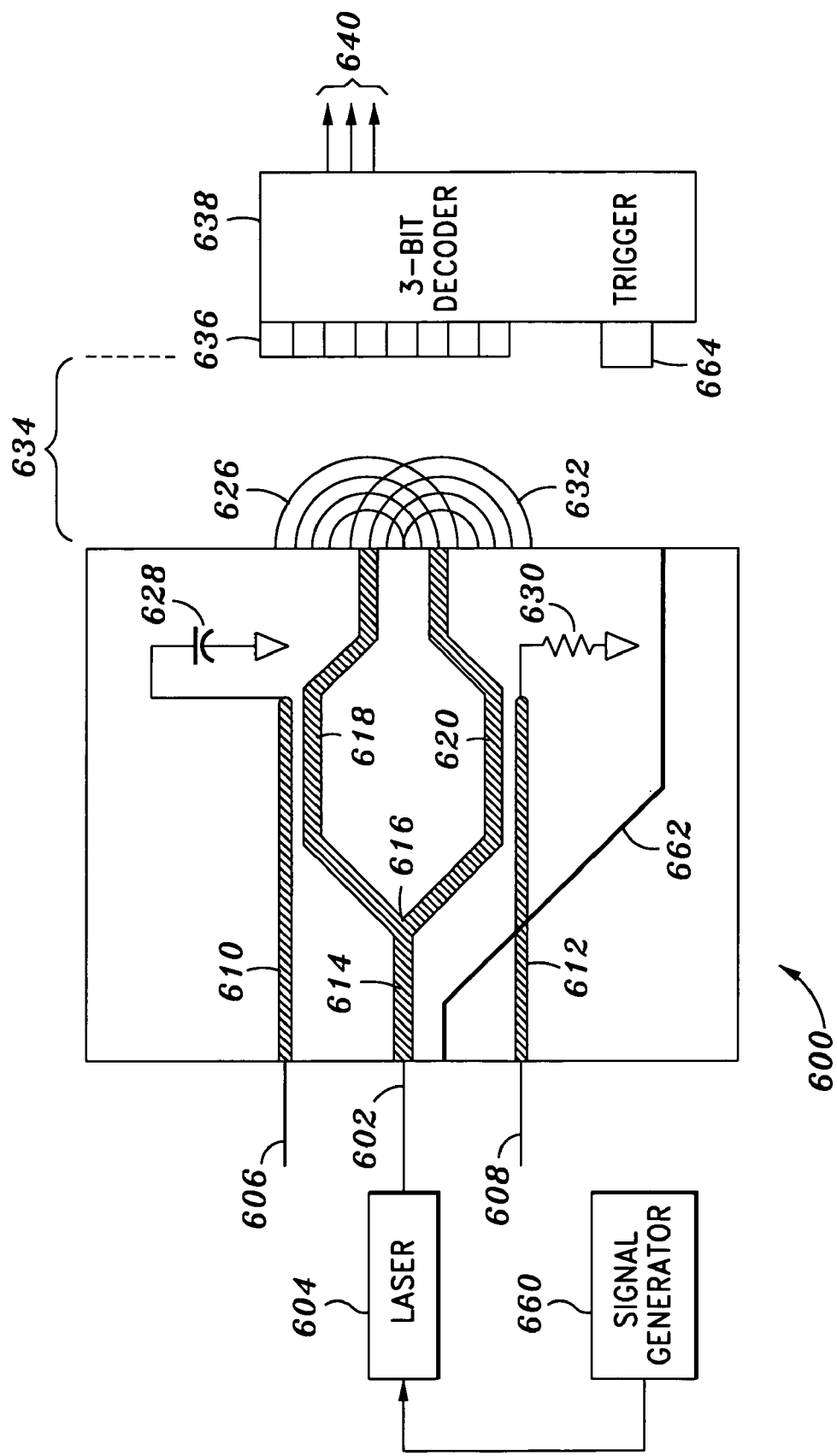
FIG. 6 depicts a dual electrooptic waveguide interferometer (DEWI) configured as a photonic analog to digital converter according to a preferred embodiment of the present invention.

FIG. 6 depicts a dual electrooptic waveguide interferometer (DEWI) 600 configured as a photonic analog to digital converter according to a preferred embodiment of the present invention. Interferometer 600 receives a pulsed optical signal 602 from a pulsed optical source. In a preferred embodiment, the pulsed optical source is a hybrid mode-locked laser 604 that is driven by a signal generator 660. A hybrid mode-locked laser is a type of laser that generates optical pulses, as is well-known in the relevant arts. Interferometer 600 also receives two electrical signals 606 and 608. Signal 606 is a reference voltage. Signal 608 is an analog voltage to be digitized.

Interferometer 600 includes two electrodes 610 and 612. In a preferred embodiment, electrodes 610 and 612 are microstrip transmission line electrodes. electrodes 610 and 612 receive electrical signals 606 and 608, respectively. Electrodes 610 and 612 are terminated to ground by capacitor 628 and resistor 630, respectively. In a preferred embodiment, electrode 612 is a 50-ohm transmission line and resistor 630 is a 50-ohm resistor.

Interferometer 600 also includes a plurality of waveguide components. Input section 614 receives optical signal 602 and feeds it to an optical divider 616, which splits the signals between two modulation sections 618 and 620. Electrode 610 is substantially parallel to waveguide modulation section 618 in a traveling wave modulator configuration that is well-known in the relevant arts. Similarly, electrode 612 is substantially parallel to waveguide modulator section 620 in a traveling wave modulator configuration. The modulated optical signals leave the exit apertures of waveguides 618 and 620 as optical signals 626 and 632, respectively.

On exiting, optical signals 626 and 632 enter a diffraction section 634 where they interfere to create an interference pattern upon a photo detector array 636. In a preferred embodiment, a 3-bit decoder 638 is employed to convert the interference pattern to a digital signal 640.

In a preferred embodiment, signal generator 660 delivers a periodic signal to hybrid mode-locked laser 604, which generates narrow light pulses. The effective sampling aperture of the photonic A/D is approximately equal to the width of the light pulse. Any mis-match in time due to a difference between the group velocity of light in waveguide 618 and the group velocity of the RF signal on microstrip transmission line 612 would increase the effective sampling aperture. The interference pattern that falls onto photo detectors 636 is sampled according to a trigger signal. A waveguide 662 couples out a portion of the light pulse from input section 614 and delivers the optical pulse to trigger detector 664 at approximately the arrival time of the interference pattern at photo detector 636. Decoder 638 receives the outputs of photo detectors 636 and converts them into a 3-bit digital signal 640.

Since pico and sub-pico second light pulses could be generated by mode locked diode lasers, the effective sampling aperture could be much narrower than the time constant of the photo detector. With EO modulators that have tens of Ghz of bandwidth, a multi-Giga sample per second A/D converter can be implemented.

Because of the cyclic nature of the output of a DEWI A/D, two devices could be put to work in parallel to double the number of bits at the expense of doubling the complexity of the electronic circuits. In contrast, with conventional A/D devices, an increase of one output bit would require double the circuit.

Figure 7:
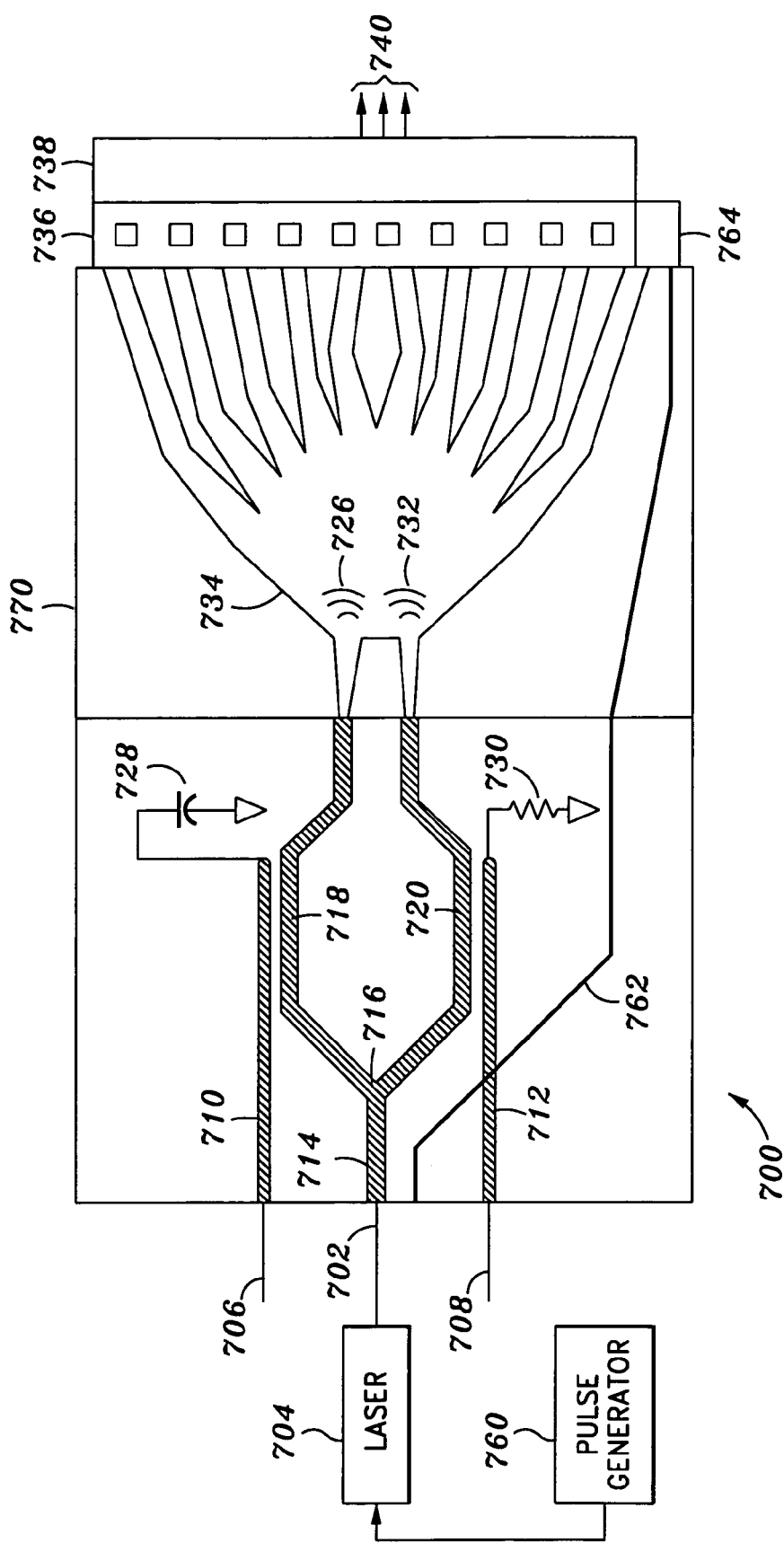
FIG. 7 depicts a dual electrooptic waveguide interferometer (DEWI) configured as a photonic analog to digital converter according to a preferred embodiment of the present invention.

FIG. 7 depicts a dual electrooptic waveguide interferometer (DEWI) 700 configured as a photonic analog to digital converter according to a preferred embodiment of the present invention. According to this embodiment, the free-space diffraction region is replaced with an optical Rotman lens 734 in a slab waveguide 770 to shape and control the boundary of the diffraction region, and to direct the optical signals in the diffraction region to the array of optical detectors. The Rotman lens in a slab waveguide is similar to a microwave Rotman Lens in a multi-layer RF board, except that the microwave material is replaced with optical material.

Interferometer 700 receives a pulsed optical signal 702 from a pulsed optical source. In a preferred embodiment, the pulsed optical source is a laser 704 that is driven by a pulse generator 760. Interferometer 700 also receives two electrical signals 706 and 708. Signal 706 is a reference voltage. Signal 708 is an analog signal to be digitized.

Interferometer 700 includes two electrodes 710 and 712. In a preferred embodiment, electrodes 710 and 712 are microstrip transmission line electrodes. Electrodes 710 and 712 receive electrical signals 706 and 708, respectively. Electrodes 710 and 712 are terminated to ground by capacitor 728 and resistor 730, respectively. In a preferred embodiment, electrode 712 is a 50-ohm transmission line and resistor 730 is a 50-ohm resistor.

Interferometer 700 also includes a plurality of waveguide components. Input section 714 receives optical signal 702 and feeds it to an optical divider 716, which splits the signal between two modulation sections 718 and 720. Electrode 710 is substantially parallel to waveguide modulation section 718 in a traveling wave modulator configuration that is well-known in the relevant arts. Similarly, electrode 712 is substantially parallel to waveguide modulator section 720 in a traveling wave modulator configuration. The modulated optical signals leave the exit apertures of waveguides 718 and 720 as optical signals 726 and 732, respectively.

On exiting, optical signals 726 and 732 enter a Rotman lens 734 where they interfere to create an interference pattern upon a photo detector array 736. In a preferred embodiment, a 3-bit decoder 738 is employed to convert the interference pattern to a digital signal 740.

Pulse generator 760 delivers a periodic pulse train to laser 704, which generates narrow light pulses. The effective sampling aperture of the A/D is approximately equal to the width of the light pulse. The interference pattern that falls onto photo detectors 736 is sampled according to a trigger signal. A trigger waveguide 762 couples out a portion of the light pulse from input section 714 and delivers the optical pulse to trigger detector 764 at approximately the arrival time of the interference pattern at photo detector 736. Decoder 738 receives the outputs of photo detectors 736 and converts them into a 3-bit digital signal 740.

Figure 8:
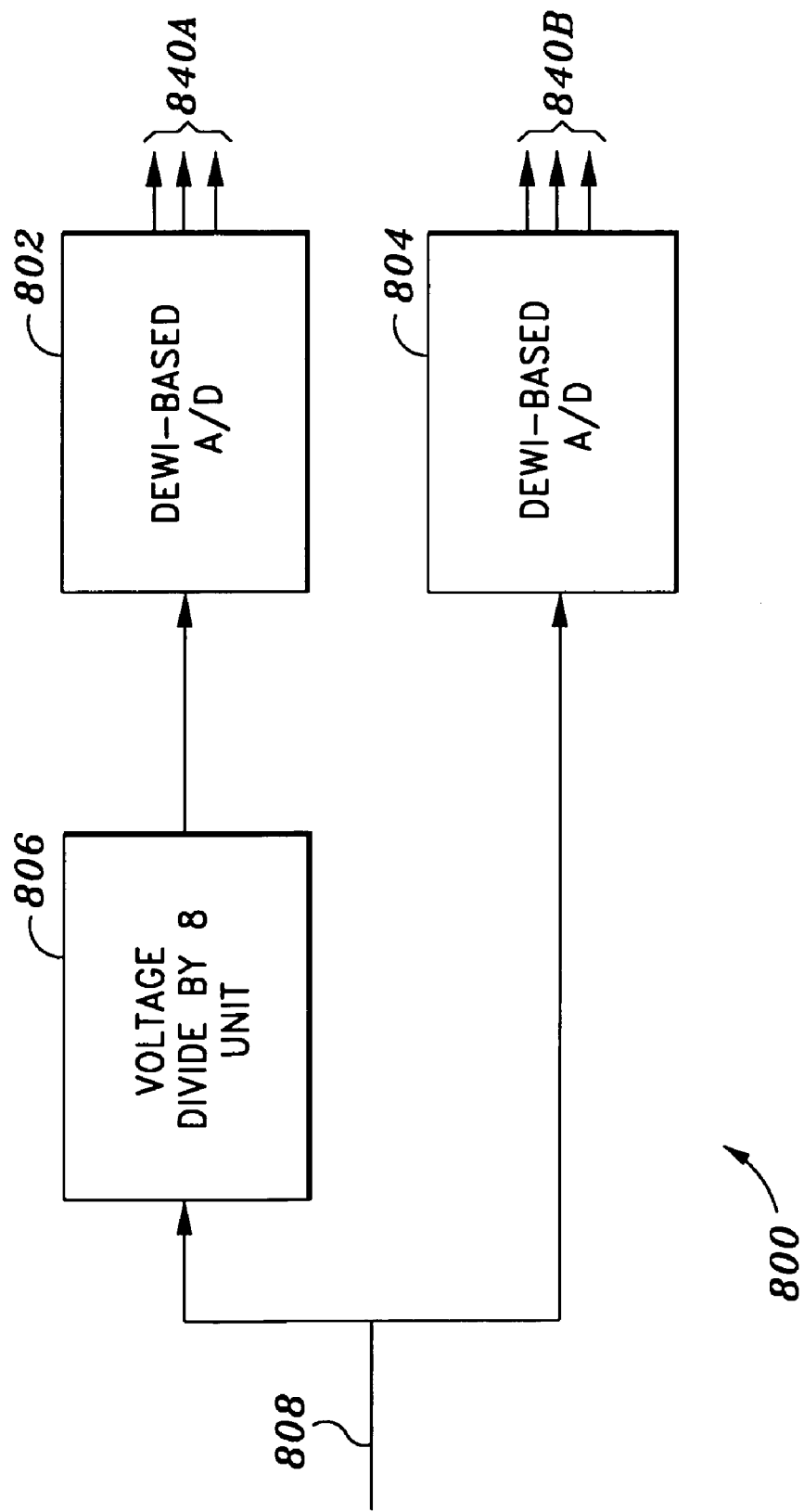
FIG. 8 depicts a block diagram of a preferred embodiment of a 6-bit high speed A/D according to the present invention.

FIG. 8 depicts a block diagram of a preferred embodiment of a 6-bit high speed A/D 800 according to the present invention. The embodiment shown in FIG. 8 uses two DEWI in parallel to extend the range of differential voltage measurement by a factor of 8 while maintaining the same measurement precision. A/D 800 includes two DEWI-based A/Ds 802 and 804 and a voltage divide by 8 unit 806. A/Ds 802 and 804 are implemented as either DEWI 200 in FIG. 2, or DEWI 500 in FIG. 5, or DEWI 600 in FIG. 6, or DEWI 700 in FIG. 7. A/D 804 receives a data electrical signal 808, while A/D 802 receives the data electrical signal 808 after it has been passed through voltage divide by 8 unit 806, which reduces the voltage range of data electrical signal 808 by a factor of 8 according to methods well-known in the relevant arts. According to this technique, A/D 802 produces the upper 3 bits 840A, and A/D 804 produces the lower 3 bits 840B.

The partitioning of the voltage range $\pm V_\pi$ into eight parts is performed by diffraction. This can be accomplished precisely. The flatness in the frequency response of the components in a high speed A/D determines the accuracy of the conversion as a function of input frequency. These are the primary factors that favor using EO modulator to implement A/D devices for high frequency applications.

For the A/Ds 802 and 804 to operate together properly, their characteristics must be well matched. Specifically, the MSB of the upper 3 bits must be accurate to within ±½ bit of the LSB of the lower 3 bits. The match between A/Ds 802 and 804 can be accomplished based on appropriately positioning the photo detectors within the photo detector array of the A/D 802, as well as adjusting the effective gain (loss) of the voltage divide by 8 unit 806.

Rotman Lens Interferometer

The design of a microwave Rotman Lens may be found in chapter 11 in the book by R. C. Hansen, "Phased Array Antennas," John Wiley & Sons, New York, 1998. The following describe briefly what a microwave Rotman lens is, and then an optical Rotman Lens functioning as an interferometer.

A microwave Rotman lens is a one-dimensional lens, with input and output ports that are denoted as beam and element ports, respectively. It accepts a wide bandwidth signal, and takes the signal from the selected input beam port and distributes it to N output element ports. The signals at the element ports are applied to an array of radiating elements. A beam is formed, and the wide bandwidth signal is radiated in a specific angular direction.

Frequently, a Rotman lens is designed to interface with a linear array. In that case, the signals at the output port have specific amplitudes and time delays relative to each other.

Figure 9:
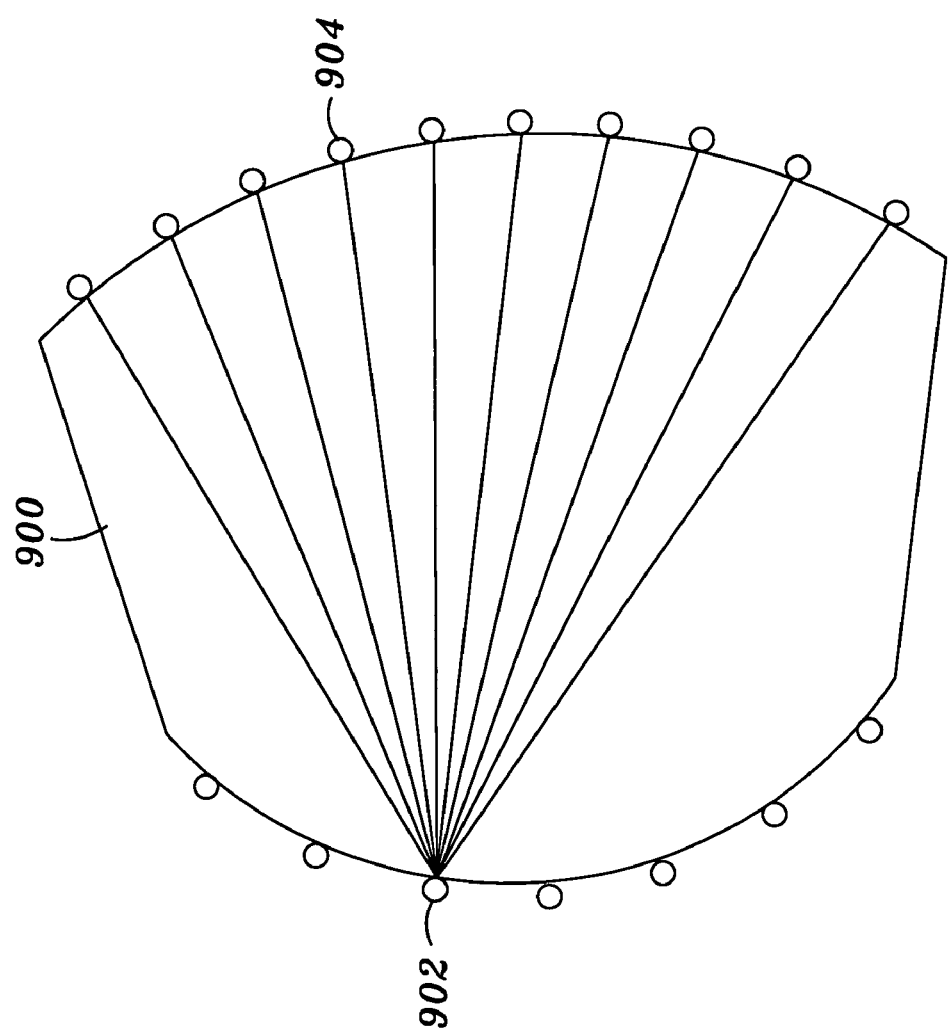
FIG. 9 depicts a Rotman lens with 7 beam ports and 10 element ports.

FIG. 9 depicts a Rotman lens with 7 beam ports 902 and 10 element ports 904.

A microwave Rotman lens usually has three focal points, one at the center of the feed array, and two at two symmetric points between the center and the edge of the beam port arc.

The design of these lenses is largely based on a geometric optic design approach. However, the mutual coupling effects between the lens ports must be minimized and verified based on measurements.

Figure 10:
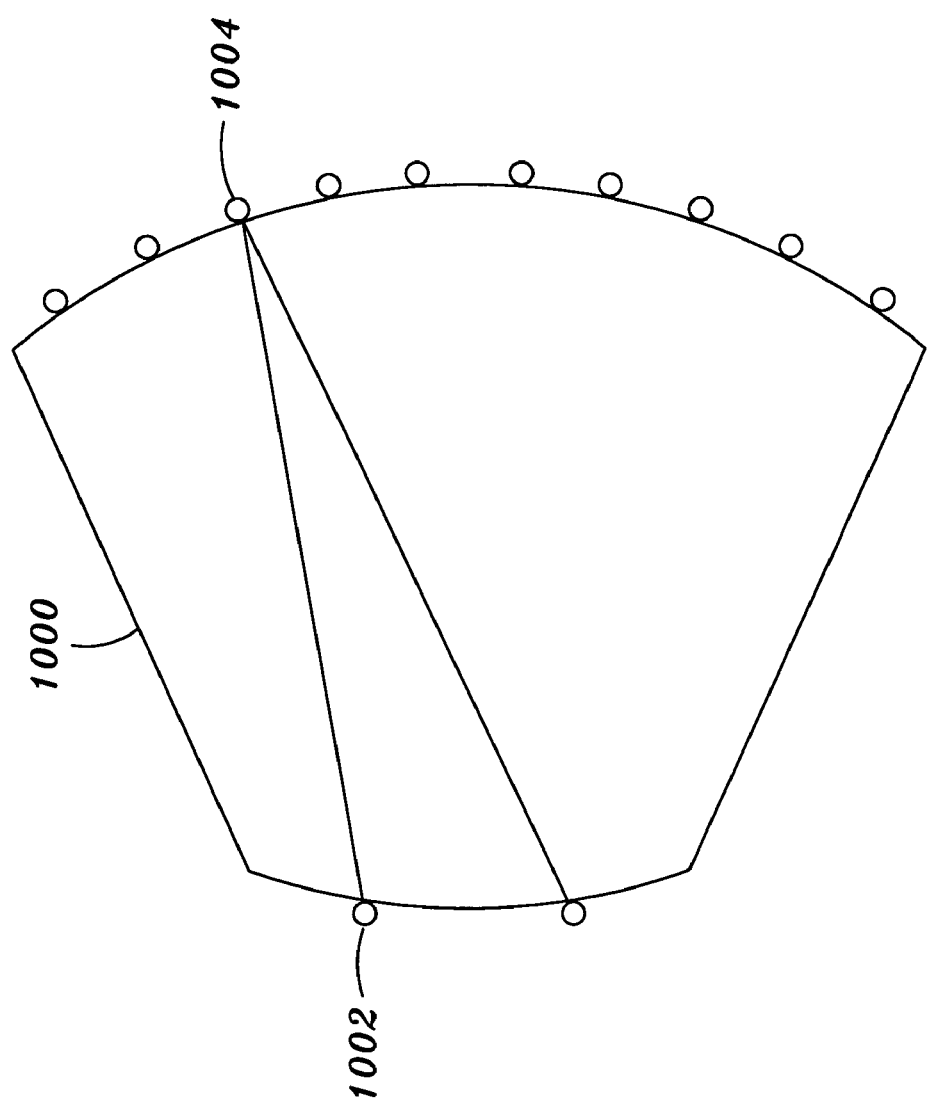
FIG. 10 depicts a Rotman lens with two beam ports and 10 element ports.

FIG. 10 depicts a Rotman lens 1000 with two beam ports 1002 and 10 element ports 1004. The basic design of Rotman lens 1000 is suitable for implementing the Rotman lens 734 in interferometer 700 of FIG. 7.

Figure 11:
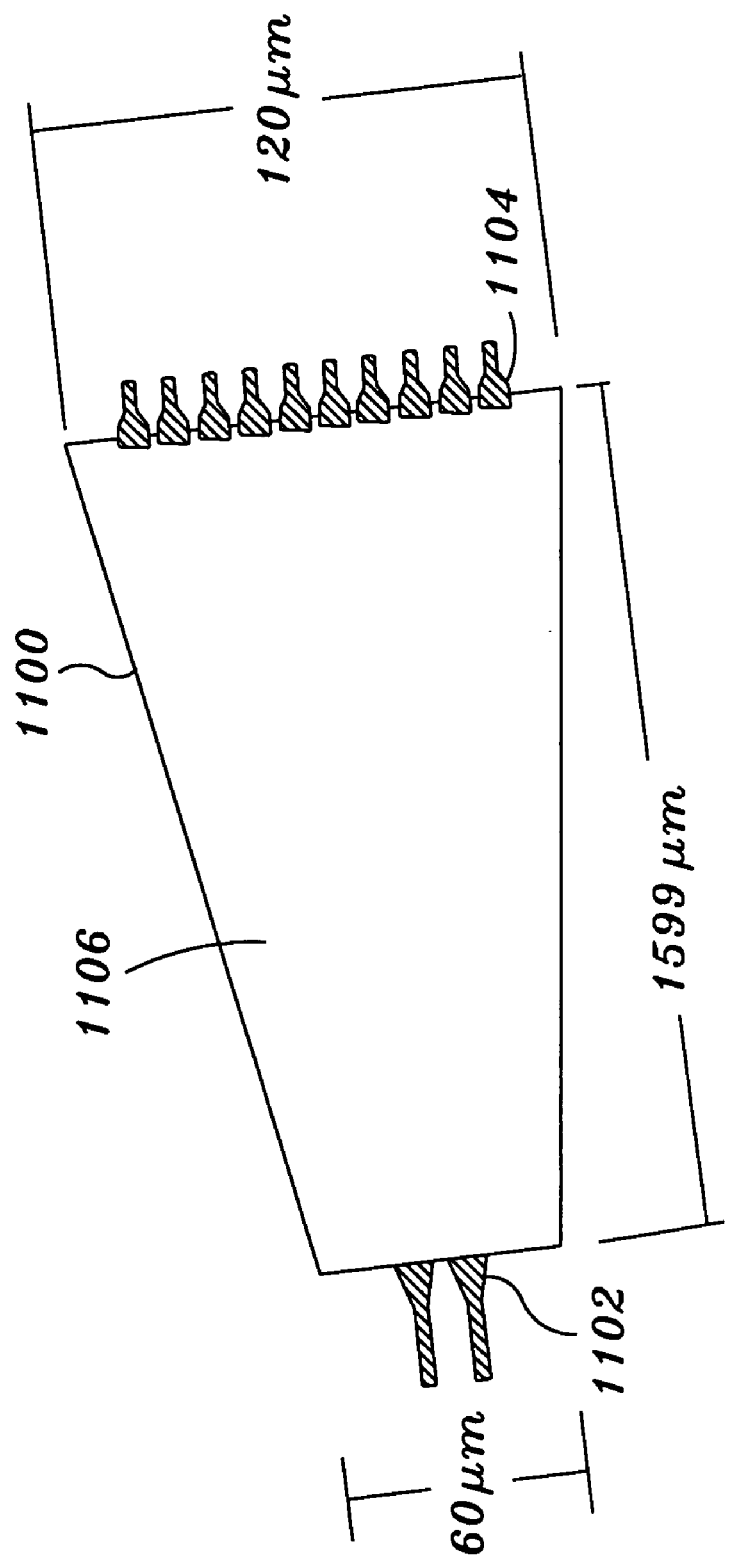
FIG. 11 depicts a Rotman lens with two beam ports and 10 element ports.

FIG. 11 depicts a Rotman lens 1100 with two beam ports 1102 and 10 element ports 1104. The basic design of Rotman lens 1100 is also suitable for implementing the Rotman lens 734 in interferometer 700 of FIG. 7. Area 1106 is the region where diffraction occurs. This area is trapezoidal, having a minor base length (i.e., on the input beam port side) of 60 micrometers, a major base length (i.e., on the output element port side) of 120 micrometers, and sides of 1599 micrometers in length in one embodiment.

An electrode with the shape that defines the shaded and darkened areas is used to define the above structure. This electrode is deposited on the triple layer polymer stack, which is deposited on a ground plane. A DC voltage may be applied to this electrode to fine tune and control the performance the optical Rotman lens.

Now the details of the input beam ports 1102 and the output element ports 1104 are described. Since the output element ports are located relatively far from the input beam ports, a waveguide to horn transition for the input beam ports is designed to illuminate the output element ports.

Figure 12:
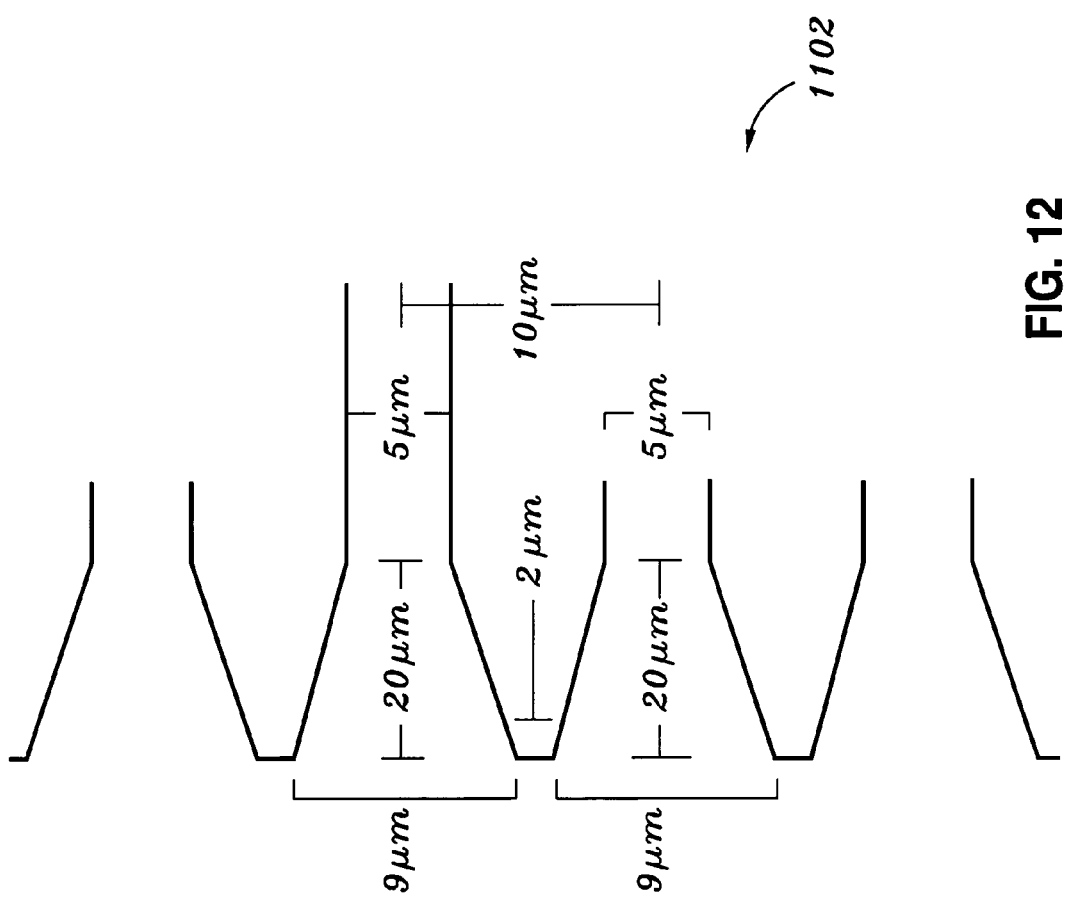
FIG. 12 depicts the geometry of Rotman lens input beam ports in one embodiment.

FIG. 12 depicts the geometry of input beam ports 1102 in one embodiment. The input optical signals are guided by rectangular optical waveguides with the dimensions 2×5 $\mu$m, or 2.0652×5.1629 wavelength, and as radiators. The corresponding radiation beam width is approximately 11°. Since the output element ports are within ±2° from the center of the input beam ports, we use a horn with a beamwidth of 4°. Thus, the input beam ports are a horn with a 14 $\mu$m aperture. Therefore, the length of horn transition is 45 $\mu$m. It makes a transition from a width of 5 $\mu$m to 14 $\mu$m. The center-to-center spacing of the horns is 20 $\mu$m.

The above computation assumes an index of refraction of 1.6005. It should be noted that the index of refraction can be controlled electronically. Electrodes deposited on top of the active polymer define the shapes of the Rotman Lens, and its input and output ports. Depending on the complexity and the flexibility desired by the lens designer, the properties of the input ports and output ports, as well as the diffraction section may be controlled by a single or multiple DC voltages applied to these electrodes.

Figure 13:
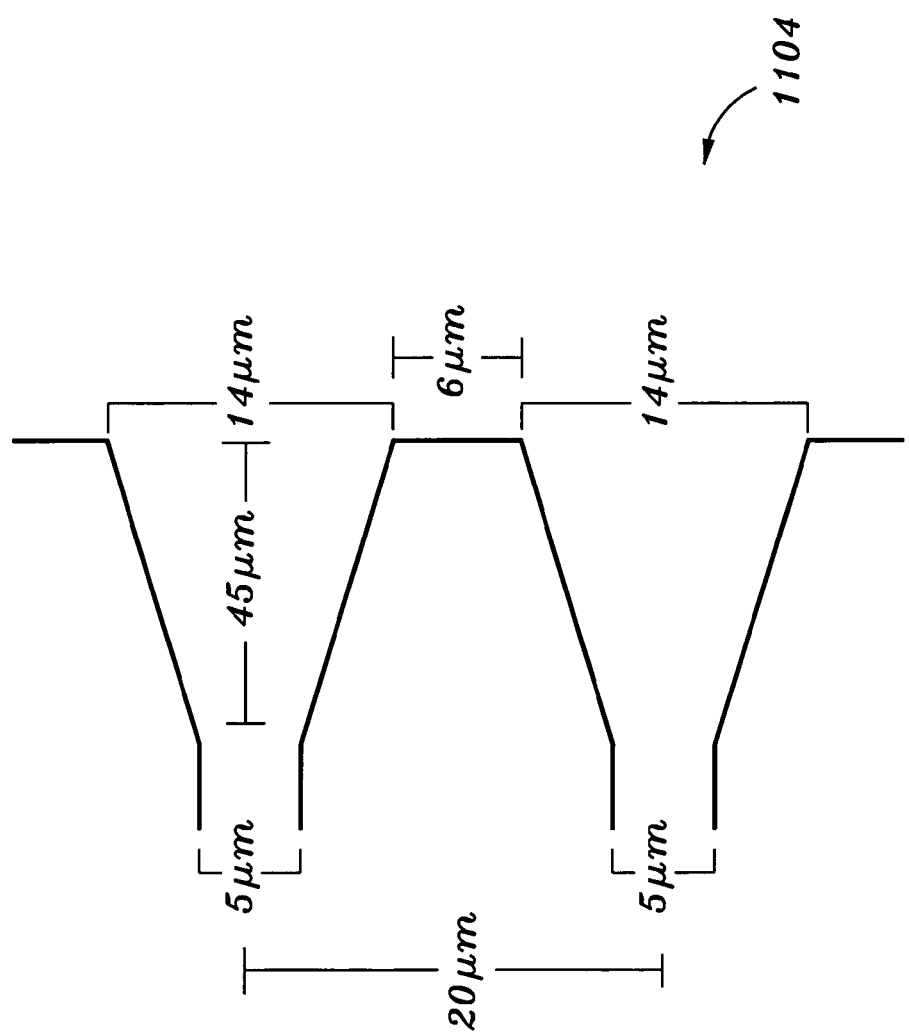
FIG. 13 depicts the geometry of Rotman lens output element ports in one embodiment.

FIG. 13 depicts the geometry of output element ports 1104 in one embodiment. Each output element ports is a horn with a 9 $\mu$m aperture. Therefore, the length of horn transition is 20 µm. It makes a transition from a width of 9 µm to 5 µm. The center-to-center spacing of the horns is 10 µm.

FIG. 14 depicts an exemplary decoder circuit 1400 for performing a three-bit decoding of the null location. Photo diodes 1402(*a*)–(*h*) receive incoming light pulses. When a light pulse arrives at a photo diode 1402, a current pulse is generated. Buffers 1404 convert these current pulses into a set of corresponding voltage levels. Buffers 1404 act as voltage buffers, diode bias circuits, and RC time control circuits. Voltage comparators 1406 compare the outputs of adjacent buffers 1404.

The amplitudes of the interference pattern as detected by photo diodes 1402 determine the outputs of voltage comparators 1406. The outputs of voltage comparators 1406 are detected by logic circuits 1408 with outputs 1410(*a*)–(*h*). For a given interference pattern applied to photo diodes 1402(*a*)–(*h*), only one of outputs 1410(*a*)–(*h*) will be high. The high output indicates the location of the null in the interference pattern. For example, the output 1410*a* will be high when the null of the interference pattern is close to photo diode 1402*a*.

The interference pattern is cyclic. For example, when a null of the interference pattern migrates in the direction from photo diode 1402(*f*) to diode 1402(*g*) to 1402(*h*), and so on, another null of the pattern would be moving closer to photo diode(a) on the other end. This cyclic feature is preserved by the logic circuit depicted in FIG. 14. This feature enables a doubling of the number of A/D bits by using two DEWI based A/D operating in parallel, as shown in FIG. 8.

Additional logic circuits are required to decode the logical outputs 1410(*a*)–(*h*) into an appropriate binary representation. The details depend on the choice of the binary representation. A 3-bit binary representation based on two's complement is shown in Table I. Decoding circuits are well known and thus they are not described here.

TABLE I

| Null location of the interference pattern | Output Logical States | Decoder Output Binary Word | Interpretation |
| --- | --- | --- | --- |
| near photo-diode a | output a = high other outputs = low | 011 | 3/8 * $V_\pi$ |
| near photo-diode b | output b = high other outputs = low | 010 | 2/8 * $V_\pi$ |
| near photo-diode c | output c = high other outputs = low | 001 | 1/8 * $V_\pi$ |
| near photo-diode d | output d = high other outputs = low | 000 | 0/8 * $V_\pi$ |
| near photo-diode e | output e = high other outputs = low | 111 | −1/8 * $V_\pi$ |
| near photo-diode f | output f = high other outputs = low | 110 | −2/8 * $V_\pi$ |
| near photo-diode g | output g = high other outputs = low | 101 | −3/8 * $V_\pi$ |
| near photo-diode h | output h = high other outputs = low | 100 | −4/8 * $V_\pi$ |

CONCLUSION

While various embodiments of the present invention have been described above, it should be understood that they have been presented by way of examples, and not limitations. It will be apparent to persons skilled in the relevant art that various changes in form and detail can be placed therein without departing from the spirit and scope of the invention. Thus the present invention should not be limited by any of the above-described example embodiments, but should be defined only in accordance with the following claims and their equivalents.

What is claimed is:

1. An apparatus comprising:
   a first optical waveguide producing a first optical input;
   a second electrode substantially parallel to the first waveguide;
   a second optical waveguide producing a second optical output;
   a second electrode substantially parallel to the second waveguide; and
   a photo detector in the path of an interference pattern produced by the first and second optical outputs.

2. The apparatus of claim 1, wherein the photo detector detects the location of a null of the interference pattern.

3. The apparatus of claim 1, wherein the photo detector includes an array of photo detector elements.

4. The apparatus of claim 3, further comprising:
   a decoder coupled to the photo detector array.

5. The apparatus of claim 4, wherein said first optical waveguide has a first input and said second optical waveguide has a second input, further comprising:
   an optical divider coupled between the inputs of the first and second optical waveguides.

6. The apparatus of claim 5, further comprising:
   a lens assembly optically coupled between the outputs of the first and second optical waveguides and the photo detector array.

7. The apparatus of claim 4, further comprising:
   a lens assembly optically coupled between the outputs of the first and second optical waveguides and the photo detector array.

8. The apparatus of claim 7, wherein the outputs of the waveguides are angled towards each other to produce a focal point.

9. The apparatus of claim 8, wherein each of said waveguides has an output port, wherein the lens assembly comprises:
   a magnifying lens optically coupled to the waveguide output ports;
   a one-dimensional focusing lens coupled to the magnifying lens; and
   a micro-lens coupled between the focusing lens and the photo detector array.

10. The apparatus of claim 9, wherein the lens assembly comprises a prism.

11. The apparatus of claim 7, wherein the lens assembly comprises an optical Rotman lens.

12. The apparatus of claim 11, wherein the optical Rotman lens has first and second inputs and multiple outputs, wherein the first and second inputs receive the outputs of the first and second optical waveguides, respectively, and wherein each element of the photo detector array receives one of the multiple outputs of the Rotman lens.

13. A method comprising:
   electro-optically modulating a first optical signal using a first electrical signal;
   electro-optically modulating a second optical signal using a second electrical signal; and
   combining the first and second modulated signals in a diffraction region, producing an interference pattern.

14. The method of claim 13, further including:
   detecting a null of the interference pattern.

15. The method of claim 13, wherein the diffraction region is a Rotman lens.

16. The method of claim 13, wherein the diffraction region is free space.

17. The method of claim 13, further comprising:
producing an output electrical signal based on the location of a null of the interference pattern.

18. The method of claim 17, wherein the interference pattern is detected by a photo detector array having multiple elements wherein each element of the photo detector array receives one of the multiple outputs of Rotman lens.

19. The method of claim 18, further comprising:
generating the first and second optical signals using a laser and an optical divider.

20. A method of measuring an input signal, comprising:
producing an interference pattern based on the input signal;
detecting a location of a null of the interference pattern, producing an output signal based on the location of the null;
receiving a first electrical input signal;
electro-optically modulating a first optical signal using the first electrical signal; and
combining the modulated first optical signal with a second optical signal to produce the interference pattern.

21. The method of claim 20, further including:
receiving a second electrical input signal;
electro-optically modulating the second optical signal using the second electrical signal; and
combining the modulated first and second optical signals to produce the interference pattern.

22. The method of claim 20, wherein the output signal is measured to determine an input voltage.

23. The method of claim 20, wherein the output signal is measured to determine the phase difference between two input optical signals.

* * * * *

UNITED STATES PATENT AND TRADEMARK OFFICE
CERTIFICATE OF CORRECTION

PATENT NO.     : 6,956,653 B1                                                           Page 1 of 1
DATED          : October 18, 2005
INVENTOR(S)    : Lawrence K. Lam et al.

It is certified that error appears in the above-identified patent and that said Letters Patent is hereby corrected as shown below:

Drawings,
Figure 1, add the legend -- PRIOR ART --.

Signed and Sealed this

Twenty-eighth Day of March, 2006

JON W. DUDAS
*Director of the United States Patent and Trademark Office*